(12) United States Patent
Ikura

(10) Patent No.: US 10,396,611 B2
(45) Date of Patent: Aug. 27, 2019

(54) ROTOR OF ROTARY MACHINE

(71) Applicant: Mitsubishi Electric Corporation, Tokyo (JP)

(72) Inventor: Yutaka Ikura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 575 days.

(21) Appl. No.: 14/758,270

(22) PCT Filed: Apr. 15, 2013

(86) PCT No.: PCT/JP2013/061182
§ 371 (c)(1),
(2) Date: Jun. 29, 2015

(87) PCT Pub. No.: WO2014/170939
PCT Pub. Date: Oct. 23, 2014

(65) Prior Publication Data
US 2015/0340917 A1  Nov. 26, 2015

(51) Int. Cl.
*F16D 1/06* (2006.01)
*H02K 1/30* (2006.01)
*F16D 1/08* (2006.01)

(52) U.S. Cl.
CPC ............... *H02K 1/30* (2013.01); *F16D 1/06* (2013.01); *F16D 1/0858* (2013.01); *Y10T 403/213* (2015.01)

(58) Field of Classification Search
CPC ......... Y10T 403/1616; Y10T 403/1624; Y10T 403/213; Y10T 403/217; Y10T 403/581;
(Continued)

(56) References Cited

U.S. PATENT DOCUMENTS 4,433,261 A * 2/1984 Nashiki ............... H02K 1/278
310/156.28
4,639,627 A * 1/1987 Takekoshi ........... H02K 1/2773
310/156.22
(Continued)

FOREIGN PATENT DOCUMENTS

CN        86100466 A    7/1986
CN        1333479 A     1/2002
(Continued)

OTHER PUBLICATIONS

International Search Report of PCT/JP2013/061182 dated Jul. 9, 2013.
(Continued)

*Primary Examiner* — Amber R Anderson
*Assistant Examiner* — Nahid Amiri
(74) *Attorney, Agent, or Firm* — Sughrue Mion, PLLC; Richard C. Turner

(57) ABSTRACT

A rotor of a rotary machine includes a ring-like fixing member press-fit and fixed to a shaft so as to limit a position of a rotor core in a shaft axial direction and an end plate fixed to an outer peripheral side of the fixing member so as to limit a position of a magnet, embedded in the rotor core, in the shaft axial direction. Influences of a difference in thermal expansion between the shaft and the end plate are lessened by the fixing member. A material is selected so that a value of a coefficient of linear expansion of the fixing member becomes equal to an intermediate value between a coefficient of linear expansion of the shaft made of iron and a coefficient of linear expansion of the end plate made of a non-magnetic body.

4 Claims, 2 Drawing Sheets

(58) Field of Classification Search
CPC ............ Y10T 403/583; Y10T 403/587; Y10T 403/7061; F16D 1/06; H02K 1/2786; H02K 1/30
USPC ....... 403/13, 14, 29, 30, 316, 317, 319, 372, 403/DIG. 1; 310/156.22, 156.27, 156.53, 310/156.56; 29/598
See application file for complete search history.

(56) References Cited

U.S. PATENT DOCUMENTS

| | | | |
|---|---|---|---|
| 4,650,560 A | 3/1987 | Ueno | |
| 4,835,840 A * | 6/1989 | Stokes | H02K 1/2793 264/263 |
| 5,140,210 A * | 8/1992 | Shirakawa | H02K 1/278 310/156.28 |
| 6,437,474 B1 * | 8/2002 | Chu | H02K 1/2773 29/598 |
| 6,672,786 B2 | 1/2004 | Schenk | F01D 5/025 403/273 |
| 7,646,194 B2 * | 1/2010 | Makino | B62D 5/0403 310/168 |
| 7,795,771 B2 * | 9/2010 | Lott | H02K 1/2733 310/156.22 |
| 7,808,147 B2 * | 10/2010 | Riedl | H02K 1/2773 310/156.53 |
| 7,986,068 B2 * | 7/2011 | Suzuki | H02K 1/276 310/156.22 |
| 8,237,432 B2 * | 8/2012 | Inotsuka | G01D 5/145 324/207.2 |
| 8,890,385 B2 * | 11/2014 | Sano | H02K 1/2766 310/156.07 |
| 9,172,278 B2 * | 10/2015 | Nakano | H02K 1/148 |
| 2007/0138890 A1 * | 6/2007 | Yu | H02K 1/278 310/156.22 |
| 2007/0147990 A1 | 6/2007 | Kamimura et al. | |
| 2008/0075402 A1 * | 3/2008 | Hewitt | F16C 35/073 384/538 |
| 2009/0020870 A1 | 1/2009 | Watanabe et al. | |
| 2009/0315423 A1 * | 12/2009 | Suzuki | H02K 1/276 310/156.12 |
| 2010/0247229 A1 * | 9/2010 | Kaiser | F16D 1/06 403/14 |
| 2011/0254399 A1 * | 10/2011 | Blanc | H02K 1/2773 310/156.22 |
| 2012/0139382 A1 | 6/2012 | Yamagishi et al. | |
| 2013/0022474 A1 * | 1/2013 | Nakayama | F04D 19/02 416/244 R |
| 2014/0028139 A1 * | 1/2014 | Hamer | B29C 45/14467 310/156.11 |
| 2014/0191608 A1 * | 7/2014 | Jang | H02K 1/2773 310/156.22 |
| 2015/0275921 A1 * | 10/2015 | Pinkney | F01D 5/025 416/204 R |

FOREIGN PATENT DOCUMENTS

| | | | |
|---|---|---|---|
| CN | 1987165 A | | 6/2007 |
| CN | 101156237 A | | 4/2008 |
| JP | 2001045685 A | * | 2/2001 |
| JP | 2004-222348 A | | 8/2004 |
| JP | 2006-187063 A | | 7/2006 |
| JP | 4365194 B2 | | 11/2009 |
| JP | 2010-4618 A | | 1/2010 |
| JP | 2010-4630 A | | 1/2010 |
| JP | 2011-205860 A | | 10/2011 |
| JP | 4837288 B2 | | 12/2011 |
| JP | 2012-125000 A | | 6/2012 |
| JP | 2013-66305 A | | 4/2013 |

OTHER PUBLICATIONS

Communication dated Jul. 13, 2017 from the State Intellectual Property Office of the P.R.C. in counterpart Application No. 201380075591.2.

Communication dated Feb. 4, 2017, from the State Intellectual Property Office of People's Republic of China in counterpart Application No. 201380075591.2.

* cited by examiner

ROTARY MACHINE

CROSS REFERENCE TO RELATED APPLICATIONS

This application is a National Stage of International Application No. PCT/JP2013/061182 filed Apr. 15, 2013, the contents of all of which is incorporated herein by reference in its entirety.

TECHNICAL FIELD

The present invention relates to a rotor of a rotary machine.

BACKGROUND ART

A rotor of an electric motor is formed by laminating a large number of magnetic steel sheets and a magnet is embedded in an opening provided in an axial direction. Also, end plates are disposed on both end faces of the rotor to prevent the magnet from falling off.

For example, one structure of the end plates is such that a resin end plate is disposed at one end of the rotor and an end plate of an integral structure made up of a resin end ring and a metal end ring is disposed at the other end.

CITATION LIST

Patent Literature

PTL 1: JP-A-2004-222348

SUMMARY OF INVENTION

Technical Problem

The end plates provided to the both end faces of the rotor of the electric motor are made of a non-magnetic material in order to prevent a short circuit between magnetic poles. An austenitic stainless material is often used as the non-magnetic material.

The stainless material of the end plates, however, has a high rate of thermal expansion for an iron shaft of the rotor. Hence, in the case of a motor whose temperature varies, the motor has a problem that an interference of shrinkage fit between the end plate and the shaft becomes loose as the end plate press-fit to the shaft undergoes thermal expansion and the motor runs idle.

The invention was devised in view of the problem discussed above and provides a rotor of a rotary machine capable of suppressing loosening of an interference by lessening influences of a difference in thermal expansion between an end plate and a shaft.

Solution to Problem

A rotor of a rotary machine of the invention is characterized by including: a shaft; a rotor core fixed to the shaft; a ring-like fixing member press-fit and fixed to the shaft so as to limit a position of the rotor core in a shaft axial direction; and an end plate fixed to an outer peripheral side of the fixing member so as to limit a position of a magnet, embedded in the rotor core, in the shaft axial direction, and characterized in that: a value of a coefficient of linear expansion of the fixing member is an intermediate value between a coefficient of linear expansion of the shaft and a coefficient of linear expansion of the end plate; and influences of a difference in thermal expansion between the shaft and the end plate are lessened by the fixing member.

Advantageous Effects of Invention

A rotor of a rotary machine of the invention is configured in such a manner that a fixing member plays a role of an intermediate member and therefore has an advantageous effect that an end plate can be fixed to a shaft in a stable manner even when a temperature varies.

The above and other objects, characteristics, points of view, and advantageous effects of the invention will become more apparent from the following detailed description of the invention taken in conjunction with the accompanying drawings.

DESCRIPTION OF EMBODIMENTS

First Embodiment

A rotor of a rotary machine according to a first embodiment of the invention will be described using FIG. 1 and FIG. 2.

Figure 1:
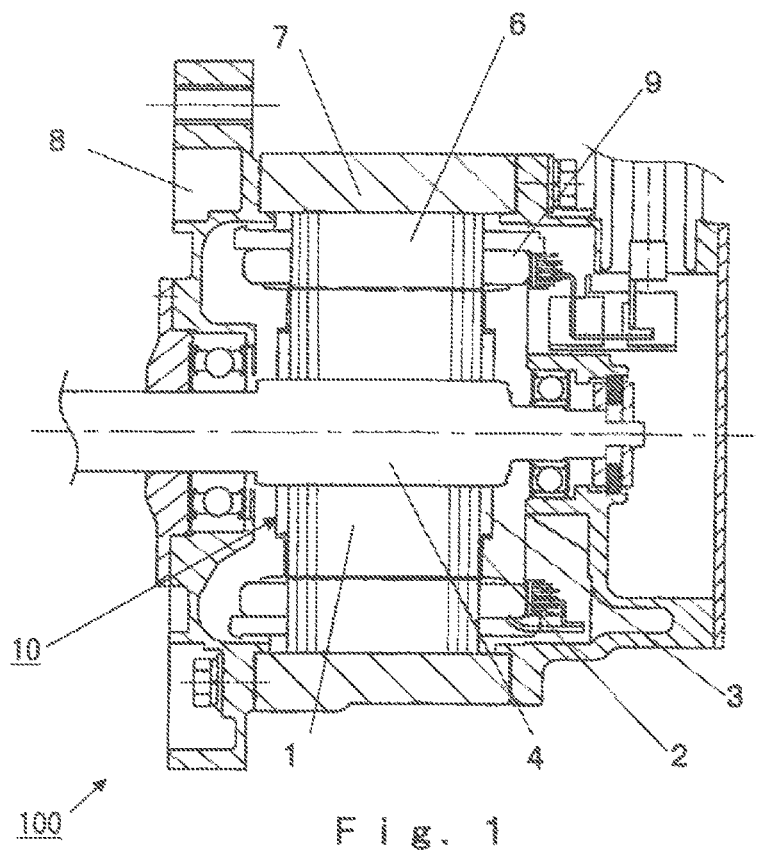
FIG. 1 is a cross section in a major portion of a rotary machine according to a first embodiment of the invention.

FIG. 1 is a cross section in a major portion of a rotary machine (hereinafter, referred to as the motor) 100. FIG. 2 is a cross section in a major portion of a rotor (hereinafter, referred to as the rotor) 10 of the motor 100.

As is shown in FIG. 1, a rotor core 1 formed by laminating magnetic steel sheets is fixed to a shaft 4 by press-fitting or shrink fitting. A plate ring-like fixing member 3 that limits a movement of the rotor core 1 in an axial direction is press-fit and fixed to the shaft 4 at either end face of the rotor core 1. As is shown in FIG. 2, a maximum diameter of the plate ring-like fixing member 3 is set to be smaller than a radial dimension of the rotor core 1. An end plate 2, which is a concentric annular plate, is press-fit and fixed to an outer peripheral side of the fixing member 3 at either end face of the rotor core 1.

Figure 2:
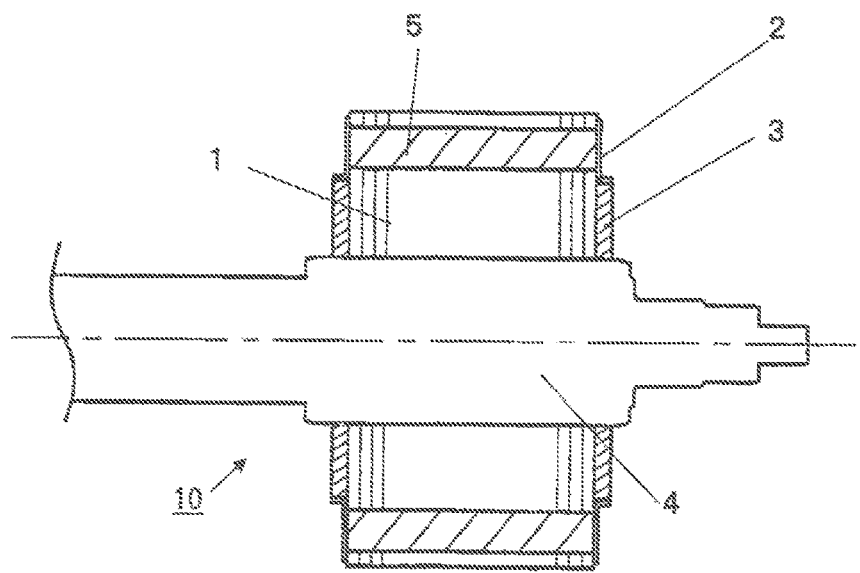
FIG. 2 is a cross section in a major portion of the rotor of the rotary machine according to the first embodiment of the invention.

In the rotor 10, as is shown in FIG. 2, the end plates 2 are disposed at two points in the axial direction of the shaft 4 and the rotor core 1 is disposed to be sandwiched between the two end plates 2.

The end plates 2 are in contact with both axial ends of a magnet 5 embedded in the rotor core 1. Further, the end plates 2 are fixed to the shaft 4 via the fixing members 3. Hence, movements of the magnet 5 in the axial direction are limited to prevent the magnets 5 from becoming misaligned in the axial direction.

In the invention, the end plate 2 is, as is shown in FIG. 2, a ring-like member having substantially an L-shaped cross section and in close contact with an outer surface of the fixing member 3 and the end face of the magnet 5 in the rotor core 1. Herein, the end plate 2 is made from a flat plate thinner than the fixing member 3. It should be appreciated, however, that the end plates 2 can be of a shape other than the one shown in FIG. 2. Likewise, the fixing member 3 of the invention, which is shaped like a plate ring by way of example, can be of a different shape. Modifications of these components will be described in a second embodiment below.

Also, the fixing member 3 is fixed to the shaft 4 first, followed by the end plate 2. More specifically, the fixing member 3 is fixed to the outer peripheral side of the shaft 4 and the end plate 2 is fixed to the outer peripheral side of the fixing member 3 so that all are fixed while all are aligned in a radial direction. In other words, the fixing member 3 is fit to a bore diameter of the end plate 2 and the shaft 4 is fit to a bore diameter of the fixing member 3.

A material of the shaft 4 is, for example, an iron magnetic body, such as steel. The end plate 2 in contact with the magnet 5 is a non-magnetic body that suppresses a leakage of a magnetic flux. The fixing member 3 is a magnetic steel sheet. For example, the end plate 2 is made from a thin plate as thin as 2 to 5 mm and, as shown in FIG. 2, the cross section is formed substantially in an L-shape. Of the end plate 2, a planar portion perpendicular to the axis is in contact with the side surface of the magnet 5 and a planar portion extending in the axial direction along the side surface of the shaft 4 is in contact with the outer surface of the fixing member 3.

In the first embodiment, an amount of protrusion of the end plate 2 in the axial direction is comparable with the thickness of the fixing member 3.

Also, the fixing member 3, which serves as an intermediate member between the shaft 4 and the end plate 2, is selected so that a value of a coefficient of linear expansion becomes equal to an intermediate value between coefficients of linear expansion of the shaft 4 and the end plate 2.

For example, assume that the value of the coefficient of linear expansion of the fixing member 3 is equal to that of the shaft 4, a degree of fitting between the fixing member 3 and the end plate 2 is thought to decrease with a temperature variation. Conversely, assume that the value of the coefficient of linear expansion of the fixing member 3 is equal to that of the end plate 2, a degree of fitting between the shaft 4 and the fixing member 3 is thought to decrease with a temperature variation.

However, by setting the value of a coefficient of linear expansion of the fixing member 3 to an intermediate value between the coefficients of linear expansion of the shaft 4 and the end plate 2 as in the first embodiment of the invention, a difference of coefficients of linear expansion between the shaft 4 and the fixing member 3 and a difference of coefficients of linear expansion between the fixing member 3 and the end plate 2 are made smaller than a difference of coefficients of linear expansion between the shaft 4 and the end plate 2. Accordingly, influences of a difference in thermal expansion between the shaft 4 and the end plate 2 are lessened and hence loosening of the interference can be suppressed.

A coefficient of linear expansion is a value indicating a variation in length of a substance that takes place with a temperature variation, and a coefficient of thermal expansion (rate of thermal expansion) is a value indicating a variation in volume.

In a case where the end plate is an end plate made of a non-magnetic body and directly press-fit and fixed to an iron shaft, when a temperature of the motor rises high, the interference is reduced and the end plate may possibly become misaligned in a rotational direction while the motor is run. In a case where a balance of the rotor is maintained by the end plates, when the end plate becomes misaligned in the rotational direction, an abnormal sound and vibrations are generated. Hence, there arises a problem that the motor performance is deteriorated. In order to prevent the end plate from rotating when the temperature is high, exact dimensional control is required for the press-fit portion. Such a requirement raises a problem that the rotor cannot be manufactured at a low cost. All these problems, however, can be solved by adopting the structure of the rotor 10 of the rotary machine of the invention.

According to the structure of the rotor 10 of the invention, the fixing member 3 serving as an intermediate member between the shaft 4 and the end plate 2 has a coefficient of linear expansion at an intermediate value between coefficients of linear expansion of the shaft 4 and the end plate 2. Hence, even when a temperature of the motor rises high, a reduction of the interference of a component press-fit to the shaft 4 can be suppressed. Consequently, a motor with stable performance can be provided.

More specifically, the rotor 10 of the invention can suppress a reduction of the interference even when a temperature of the motor 100 rises high by press-fitting and fixing the end plate 2 to the shaft 4 via the fixing member 3. Hence, the end plate 2 does not become misaligned in the rotational direction while the motor 100 is run. Further, because the end plate 2 does not become misaligned in the rotational direction, an abnormal sound and vibrations are not generated even in a case where a balanced of the rotor 10 is maintained by the end plates 2. Consequently, stable motor performance can be obtained. Further, in comparison with a case where the end plate is directly press-fit to the shaft, exact dimensional control on the press-fit portions is not required when the fixing member 3 is press-fit to the shaft 4 and the end plate 2 is press-fit to the fixing member 3. The rotor 10 can be therefore manufactured at a low cost.

Second Embodiment

A second embodiment will describe modifications of the fixing member 3 and the end plate 2 described in the first embodiment above.

Figure 3:
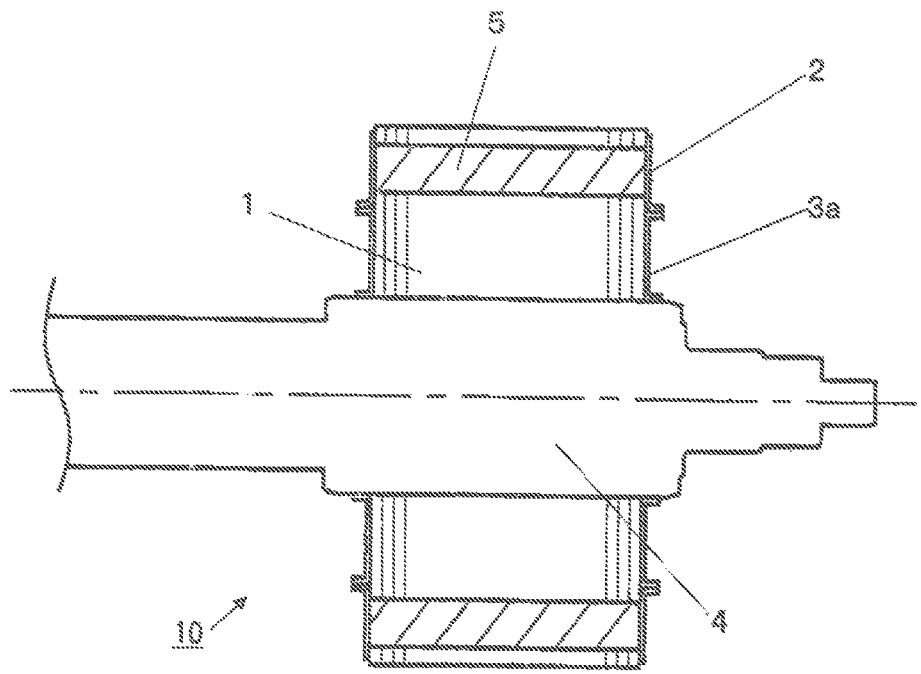
FIG. 3 is a cross section in a major portion of a rotor of a rotary machine according to a second embodiment of the invention.

FIG. 3 is a cross section of a rotor 10 according to the second embodiment of the invention.

In the first embodiment above, the fixing member 3 is shaped like a plate ring. By contrast, as is shown in FIG. 3 illustrating a cross section in a major portion of the rotor 10, a fixing member 3a is of a ring shape having substantially a U-shaped cross section and made from a thin plate made of a metal material.

The fixing member 3a having substantially a U-shaped cross section is disposed in such a manner that respective three planes on the outside are in contact with an outer surface of the shaft 4, an end face of the rotor core 1 in the axial direction, and an inner surface of the endplate 2 along a bore diameter.

In short, the shaft 4 is press-fit and fixed to an inner side of a thin annular portion of the fixing member 3a on an inner peripheral side of the rotor 10. Further, the end plate 2, which is a concentric annular plate, is press-fit and fixed to a thin annular portion of the fixing member 3a on an outer peripheral side of the rotor 10.

As has been described in the first embodiment above, in a case where the fixing member 3 is solid (shaped like a simple flat plate), too large an interference induces circumferential stress greater than an allowable value of the material when the fixing member 3 is press-fit to the shaft 4. It is therefore difficult to control dimensions of the components. Such being the case, dimensional control is made easy in the first embodiment above by selecting a material of the fixing member 3 using the value of a coefficient of linear expansion as a parameter.

By contrast, the second embodiment adopts an intermediate member structure by which the circumferential stress is hardly increased by reducing a thickness of the press-fit portion of the fixing member 3*a* to the shaft 4 and a thickness of the press-fit portion of the fixing member 3*a* to the end plate 2. By using a thin plate as a material of the fixing member 3*a*, the interference can be increased while the circumferential stress is suppressed in comparison with a case where a thick material is used. Hence, a difference in variation of the interference arising from a difference of coefficients of linear expansion can be absorbed by reducing a thickness of the material of the fixing member 3*a*.

By interposing the fixing member 3*a* made from a thin plate as an intermediate member between the shaft 4 and the end plate 2 in this manner, influences of a difference in thermal expansion between the shaft 4 and the end plate 2 can be lessened.

Figure 4:
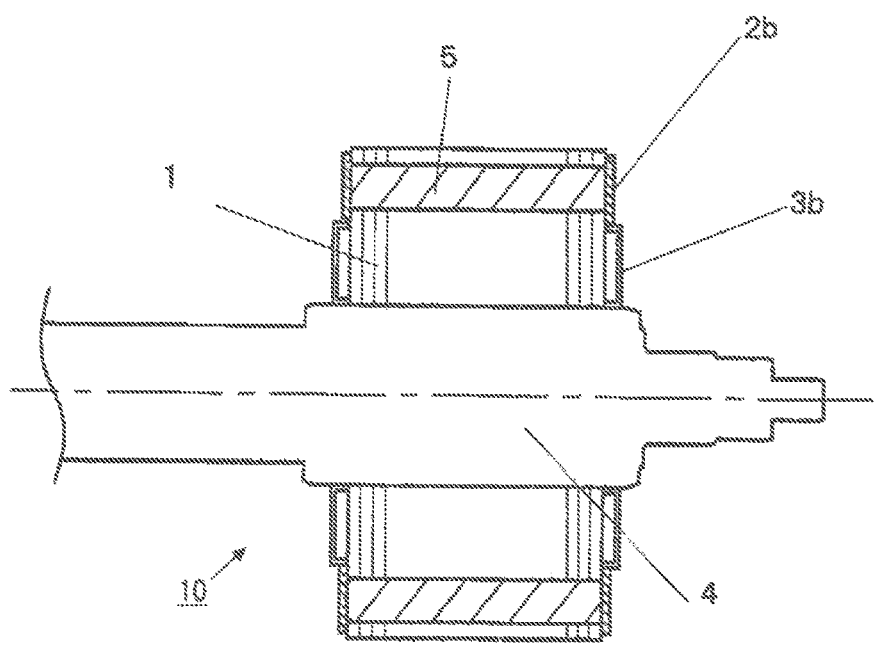
FIG. 4 is a cross section in a major portion of the rotor of the rotary machine according to the second embodiment.

Alternatively, as is shown in FIG. 4, the fixing member 3*a* may be reversed and fixed to the shaft 4, so that the fixing member 3*a* is disposed in the rotor 10 as a fixing member 3*b*.

The example of FIG. 3 is a case where the fixing member 3*a* made from a thin plate having substantially a U-shaped cross section is disposed so that one plane is in contact with a side surface of the rotor core 1. On the contrary, the example of FIG. 4 is a case where planes of the fixing member 3*b* made from a thin plate having substantially a U-shaped cross section are in contact with an outer surface of the shaft 4 and an inner surface of the end plate 2 (or 2*a* or 2*b*) whereas the fixing member 3*b* is prevented from coming into surface-contact with an end face (surface perpendicular to the axis) of an rotor core 1. Even when the fixing member 3*b* is disposed in this manner, advantageous effects same as those of the fixing members 3 and 3*a* can be obtained.

FIG. 1 through FIG. 3 show an end plate made from a thin plate having substantially an L-shaped cross section as the end plate 2 byway of example. However, a plate ring-like end plate 2*b* as shown in FIG. 4 can be used as well.

In either case, a tip end of the U-shaped cross section of the fixing member 3*a* or 3*b* is in a state closer to the thin plate and circumferential stress is lessened in this portion. Hence, it can be said that either shape is suitable for an intermediate member.

Third Embodiment

The first embodiment above has described that a value of the coefficient of linear expansion of the fixing member 3 is an intermediate value between those of the shaft 4 and the end plate 2 and that a magnetic steel sheet is used for the fixing member 3. The second embodiment above has described that the fixing members 3*a* and 3*b* are made from a thin plate having substantially a U-shaped cross section. A third embodiment will describe a case where a spring material is used for the fixing member 3 (3*a* or 3*b*).

The spring material referred to herein is a material having a spring property and generally used often for a sheet spring, an etching material, and a shim plate. Representative materials include but not limited to a stainless strip for spring called a SUS spring material, such as SUS304CSP and SUS301CSP.

By using a spring material for the fixing member 3 (3*a* or 3*b*), a fixing force can be increased by a spring force of the spring material. Hence, the shaft 4, the fixing member 3 (3*a* or 3*b*), and the end plate 2 (2*b*) can be fixed more firmly.

It should be appreciated that the respective embodiments of the invention can be combined without any restriction and the respective embodiments can be modified and omitted as needed within the scope and sprit of the invention.

INDUSTRIAL APPLICABILITY

A rotor of a rotary machine of the invention can be used as a rotor of an electric motor equipped with an end plate used to prevent a magnet from falling off.

The invention claimed is:

1. A rotor of a rotary machine comprising:
a shaft;
a rotor core fixed to the shaft;
a ring shaped fixing member press-fit and fixed to the shaft so as to limit a position of the rotor core in a shaft axial direction; and
an end plate fixed to an outer peripheral side of the fixing member so as to limit a position of a magnet, embedded in the rotor core, in the shaft axial direction,
a value of a coefficient of linear expansion of the fixing member being an intermediate value between a coefficient of linear expansion of the shaft and a coefficient of linear expansion of the end plate, and influences of a difference in thermal expansion between the shaft and the end plate being lessened by the fixing member;
wherein the fixing member is made of a thin metal material and has substantially a U-shaped cross section;
wherein the U-shaped cross section includes a first portion extending axially, a second portion extending radially outward from the first portion and a third portion extending axially from an radially outermost portion of the second portion.

2. The rotor of the rotary machine according to claim 1, wherein the fixing member is made of a spring material.

3. The rotor of the rotary machine according to claim 1, wherein the end plate is fixed to a radially outer peripheral side of the fixing member and extends radially outward of the fixing member.

4. The rotor of the rotary machine according to claim 1, wherein the end plate lies axially outward of a plurality of magnets embedded in the rotor core.

* * * * *